(12) United States Patent
Henion et al.

(10) Patent No.: US 6,254,242 B1
(45) Date of Patent: Jul. 3, 2001

(54) POTENTIOMETER FOR MOTORIZED MIRROR

(75) Inventors: Paul R. Henion, Fort Gratiot; James S. Sturek, St. Clair, both of MI (US)

(73) Assignee: Britax Vision Systems (North America) Inc., Marysville, MI (US)

( * ) Notice: Subject to any disclaimer, the term of this patent is extended or adjusted under 35 U.S.C. 154(b) by 0 days.

(21) Appl. No.: 09/352,088

(22) Filed: Jul. 14, 1999

(51) Int. Cl.[7] .................................................. G02B 7/182
(52) U.S. Cl. ........................ 359/872; 359/873; 359/874; 359/877
(58) Field of Search ........................ 359/872, 873, 359/874, 877; 248/485, 487, 550; 364/508

(56) References Cited

U.S. PATENT DOCUMENTS

| | | | |
|---|---|---|---|
| 3,628,862 | * 12/1971 | Stephenson | 359/872 |
| 4,306,124 | 12/1981 | Kondo et al. | 200/17 R |
| 4,682,088 | 7/1987 | Sullivan | 318/568 |
| 4,689,537 | 8/1987 | Mizuta et al. | 318/568 |
| 4,698,571 | 10/1987 | Mizuta et al. | 318/568 |
| 4,706,194 | 11/1987 | Webb et al. | 364/424 |
| 4,727,302 | 2/1988 | Mizuta et al. | 318/567 |
| 4,845,415 | 7/1989 | Steely | 318/568.1 |
| 4,929,878 | 5/1990 | Hansen | 318/575 |
| 4,986,646 | 1/1991 | Hamamoto et al. | 359/872 |
| 5,095,257 | 3/1992 | Ikeda et al. | 318/568.1 |
| 5,111,125 | 5/1992 | Barrs | 318/603 |
| 5,142,209 | 8/1992 | Barrs | 318/470 |
| 5,179,382 | 1/1993 | Furuse et al. | 318/603 |
| 5,185,562 | 2/1993 | Huyer | 318/466 |
| 5,187,665 | 2/1993 | Futami et al. | 364/424.05 |
| 5,197,007 | 3/1993 | Parker | 364/424.05 |
| 5,204,592 | 4/1993 | Huyer | 318/466 |
| 5,414,335 | 5/1995 | Sato | 318/466 |
| 5,461,294 | 10/1995 | Kitazawa | 318/685 |
| 5,530,327 | 6/1996 | Vecchiarino | 318/293 |
| 5,563,483 | 10/1996 | Kowall et al. | 318/283 |
| 5,633,571 | 5/1997 | Huyer | 318/468 |
| 5,663,622 | 9/1997 | Sekiguchi | 318/563 |
| 5,796,176 | 8/1998 | Kramer et al. | 307/10.1 |
| 5,812,420 | * 9/1998 | Takahashi | 364/508 |
| 5,822,707 | 10/1998 | Breed et al. | 701/49 |
| 5,886,517 | 3/1999 | Reichmann et al. | 324/207.2 |

* cited by examiner

*Primary Examiner*—Mohammad Sikder
(74) *Attorney, Agent, or Firm*—Warn, Burgess & Hoffmann, P.C.

(57) ABSTRACT

A position sensing device for a mirror assembly displaced by an electric motor for a mirror assembly having a memory unit which relies upon position information. The position sensing device connects directly between the housing reinforcement member and the mirror glass. The position sensing device also includes inherent damping capabilities. A dampening assembly provides additional damping capabilities, thereby further limiting vibration of the mirror due to road and wind vibration.

18 Claims, 3 Drawing Sheets

POTENTIOMETER FOR MOTORIZED MIRROR

BACKGROUND OF THE INVENTION

1. Field of the Invention

The present invention relates to vehicle mirror systems which may be adjusted by electrically controlled motors and, more particularly, to a potentiometer for measuring the position of the mirror glass which includes dampening properties to minimize vibrations affecting the mirror glass.

2. Discussion

In order to facilitate use of exterior mirror assemblies on vehicles, many mirror assemblies come equipped with a pair of electric motors which may be operated within the vehicle. Electrical signals sent to the motors by an internal vehicle switch causes displacement of the motors which in turn causes displacement of the mirror glass. This facilitates adjusting the position of the mirror glass so that driver can obtain an optimum view with the minimum effort. To further facilitate the use of motorized mirror assemblies for operation by the driver, some motorized mirror assemblies include a memory so that vehicle mirror or mirrors can be set to a predetermined position and the position can be memorized. The mirror or mirrors can later be automatically returned to the predetermined position for a particular vehicle operator. One or more vehicle operators can be accommodated by providing corresponding memory settings for each driver.

Mirror assembly systems having memory capabilities include one or a pair of motors to displace the mirror glass about a pivot point for the mirror glass. The motors typically include a position sensor which measures displacement of the motor to determine the position of the mirror glass. In such systems, the position sensor attaches to the motor housing at one end and to the gear train at the other end in order to measure displacement of the gear train. By arranging the position sensor in this manner, the position sensor will have inherent inaccuracies due to the play or slop in the gear train, commonly known as backlash. Such systems effectively measure the position of the motor, rather than the position of the mirror glass.

Existing systems utilize a position sensor which has no damping capability. Because exterior mirrors are subject to road vibration transmitted through the vehicle and wind vibration, such position sensing devices output a signal adversely affected by the vibration experienced by the mirror glass. The varying signal introduces inherent inaccuracy when attempting to position the mirror when the vehicle is in operation. Although the position signal output by the position sensor can be filtered, this adds to the cost of the electrical control system for the mirror assembly.

It is an object of the present invention to provide a mirror assembly having a position sensor which measures the actual position of the mirror glass.

It is a further object of the present invention to provide a mirror assembly having a position sensor for the mirror glass which is detached from the motor mechanism.

It is yet a further object of the present invention to provide a position sensor for the mirror glass which is unaffected by backlash in the motorized gear train.

It is yet a further object of the present invention to provide a position sensor having dampening properties to compensate for noise and vibration experienced by the mirror assembly.

SUMMARY OF THE INVENTION

This invention is directed to a mirror assembly for a vehicle. The mirror assembly includes a mirror housing and a reflective element. A backing assembly is supported by the mirror housing. The backing assembly supports the reflective element and includes a pivot point about which the backing assembly and the reflective element pivot. An electric motor is mounted to the mirror housing and is responsive to an electrical input to displace the backing assembly and supported reflective element about the pivot point. A position sensor detects displacement of the backing assembly, and the position sensor includes a dampener to dampen movement of the position sensor.

These and other advantages and features of the present invention will become readily apparent from the following detailed description, claims and drawings.

BRIEF DESCRIPTION OF THE DRAWINGS

The drawings, which form an integral part of the specification, are to be read in conjunction therewith, and like reference numerals are employed to designate identical components in the various views.

DETAILED DESCRIPTION OF THE INVENTION

Figure 1:
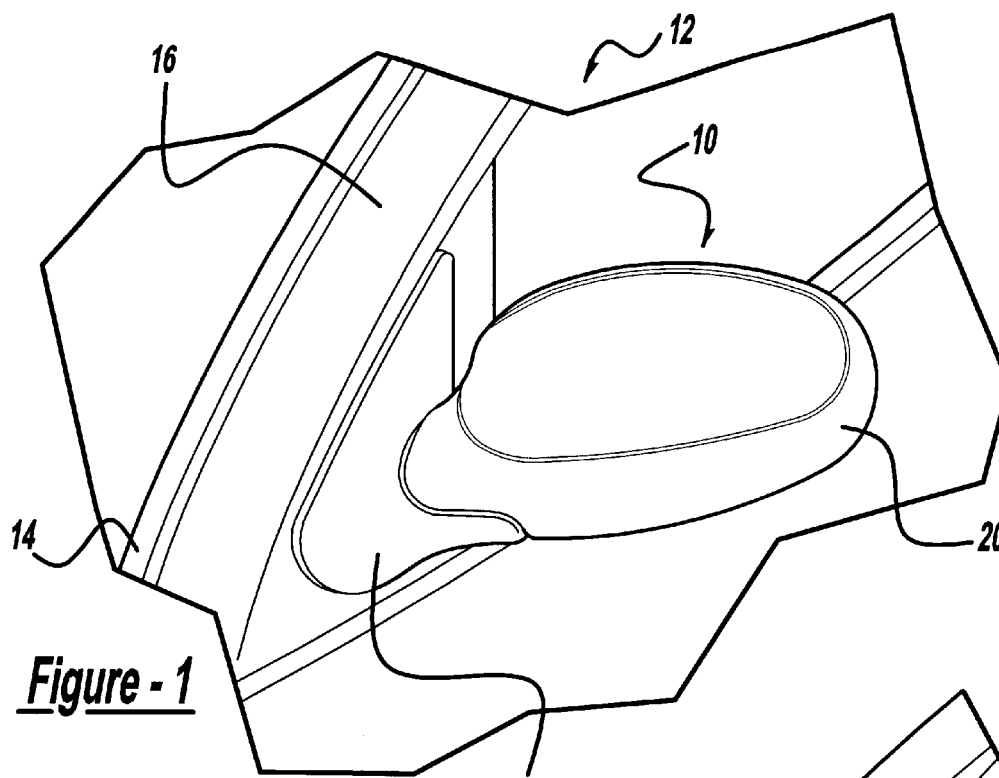
FIG. 1 is a front perspective view of the mirror assembly mounted to a vehicle arranged in accordance with the principles of the present invention.
Figure 2:
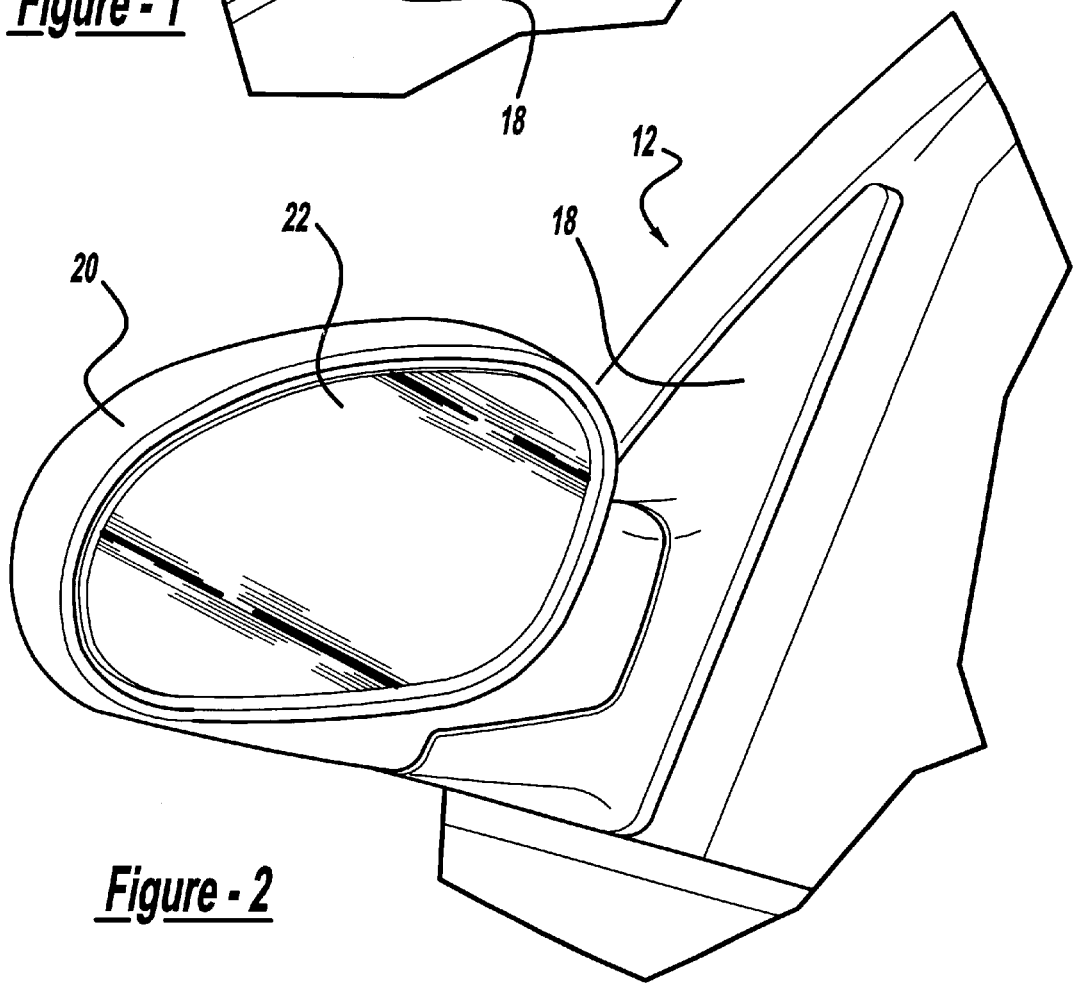
FIG. 2 is a rear perspective view of the mirror assembly of FIG. 1.
Figure 3:
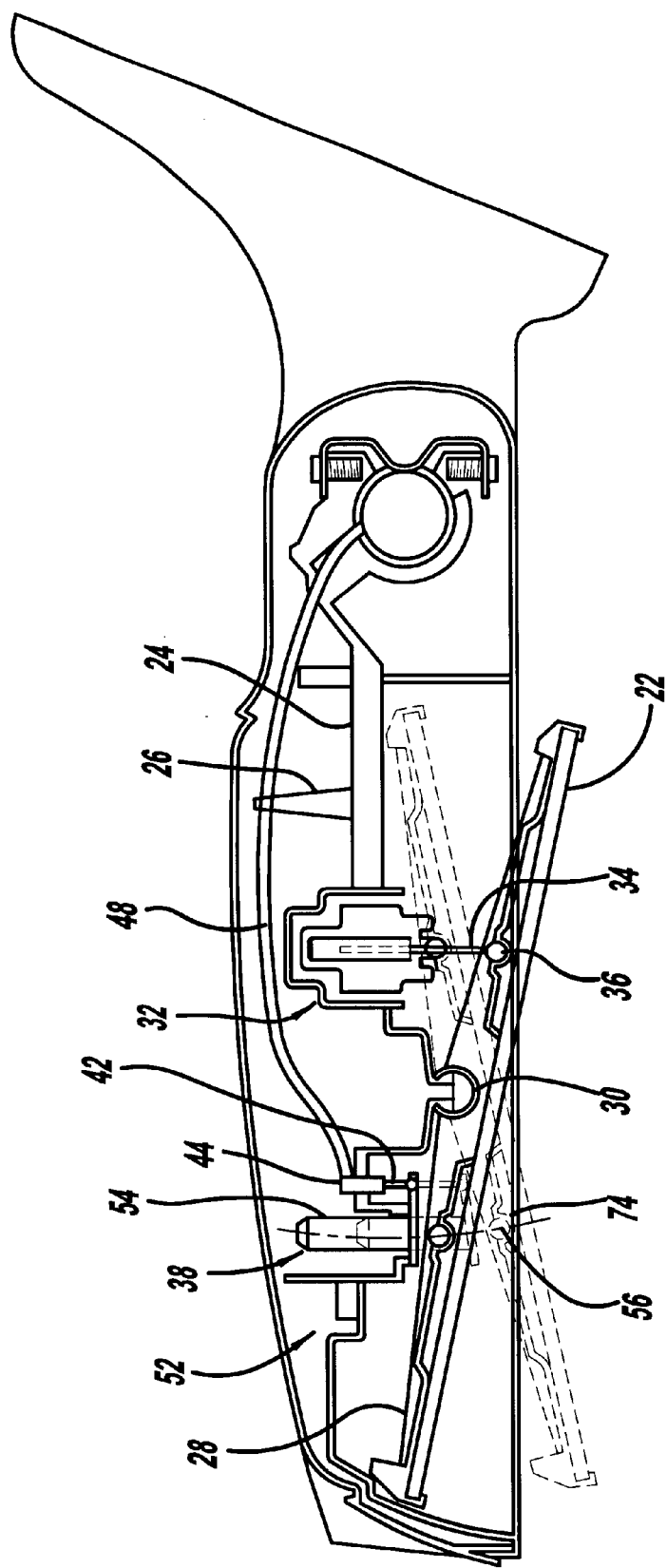
FIG. 3 is a horizontal cross-section of the mirror assembly showing the position sensor arranged in accordance with the principles of the present invention.

The present invention will be described with respect to FIGS. 1–4. Mirror assembly 10 attaches to a vehicle 12 in proximity to the A-pillar 14. In the embodiment shown, mirror assembly 10 is a left side mirror assembly, as would be used for a driver side and rear view exterior mirror. Mirror assembly 10 attaches to the front portion of a vehicle door 16 or to A-pillar 14 via a bracket 18. Bracket 18 attaches to housing 20. Preferably, housing 20 pivots with respect to bracket 18 so that housing 20 may be displaced in response to an applied force in order to prevent housing 20 from breaking off from bracket 18.

Mirror glass 22 is supported within housing 20. Housing 20 includes a housing reinforcement member 24 which is mounted to bosses or supports 26. Bosses or supports 26 may be integrally formed with housing 20, such as through an injection molding process, or may be attached to housing 20 through a separate process. Housing reinforcement member 24 fastens to bosses 26 using a threaded fastener, rivet, heat staking process, or other suitable fasteners. Housing reinforcement member 24 supports a backing plate 28 which attaches to and supports mirror glass 22. Backing plate 28 preferably pivots with respect to housing reinforcement member 24 about a center point 30.

Pivotal movement of backing plate 28 and attached mirror glass 22 is accomplished through electronic adjustment means. In particular, a motor 32 such as a direct current (DC) operated motor includes a shaft 34 which moves in an axial direction upon actuation of motor 32. Shaft 34 includes a head 36 which connects to backing plate 28. Displacement of motor 32 causes backing plate 28 and mirror glass 22 to rotate about center point 30. In the sectional view of FIG. 3, this displacement occurs about a vertical axis in proximity to center point 30, thereby varying the distance away from the vehicle which the operator may view through mirror glass 22.

Opposite center point 30 of motor 32, a position sensor assembly 38 is mounted to housing reinforcement number 28. Position sensor assembly 38 will be described herein as a dampened potentiometer which has a varying resistance in accordance of displacement of a wiper or shaft. Position sensor assembly 38 includes a potentiometer 40. Potentiometer 40 includes a wiper or shaft 42. Shaft 42 may be displaced into and out of potentiometer housing 44. The opposite end of shaft 42 includes a head 46. Potentiometer 40 includes a trio of electrical leads 48 and operates as is well known in the art. Briefly, displacement of wiper or shaft 42 into and out of potentiometer housing 44 varies the resistance between a predetermined pair of electrical leads 48. By determining the variation in resistance in accordance with displacement and storing the same in memory or generating a function correlating the two, displacement of shaft 42 can be determined in accordance with vibration across the two predetermined two electrical leads 48.

In a preferred embodiment, potentiometer housing 44 includes a viscous fluid which dampens movement of shaft 42 into and out of potentiometer housing 44, thereby dampening vibrational-type movement of mirror glass 22. In order to maintain a seal of potentiometer housing 40, an o-ring 50 is disposed around shaft 42 where shaft 42 passes into potentiometer housing 44.

In addition to the dampening properties described above, mirror assembly 10 is also shown with a dampening assembly 52. Dampening assembly 52 connects to housing reinforcement member 24 at one end and to backing plate 28 at another end. Dampening assembly 52 includes a friction pin 54 having a head 56 and a shank 58. Friction pin 54 includes flange 60 arranged between head 56 and shank 58. Flange 60 includes a socket 62 which receives head 46 of potentiometer 40. Engagement between friction pin 54 and potentiometer 40 enables friction pin 54 to dampen movement of potentiometer 40. The shank 58 of friction pin 54 passes through a dampening spring 64 which exerts a clamping force upon shank 58 to thereby dampen movement of friction pin 54. A pair of symmetric retaining lips 66 hold dampening spring in position to housing reinforcement number 24. Retaining spring 64 constricts movement of friction pin 54 to induce drag on the pin as it moves in and out.

Figure 4:
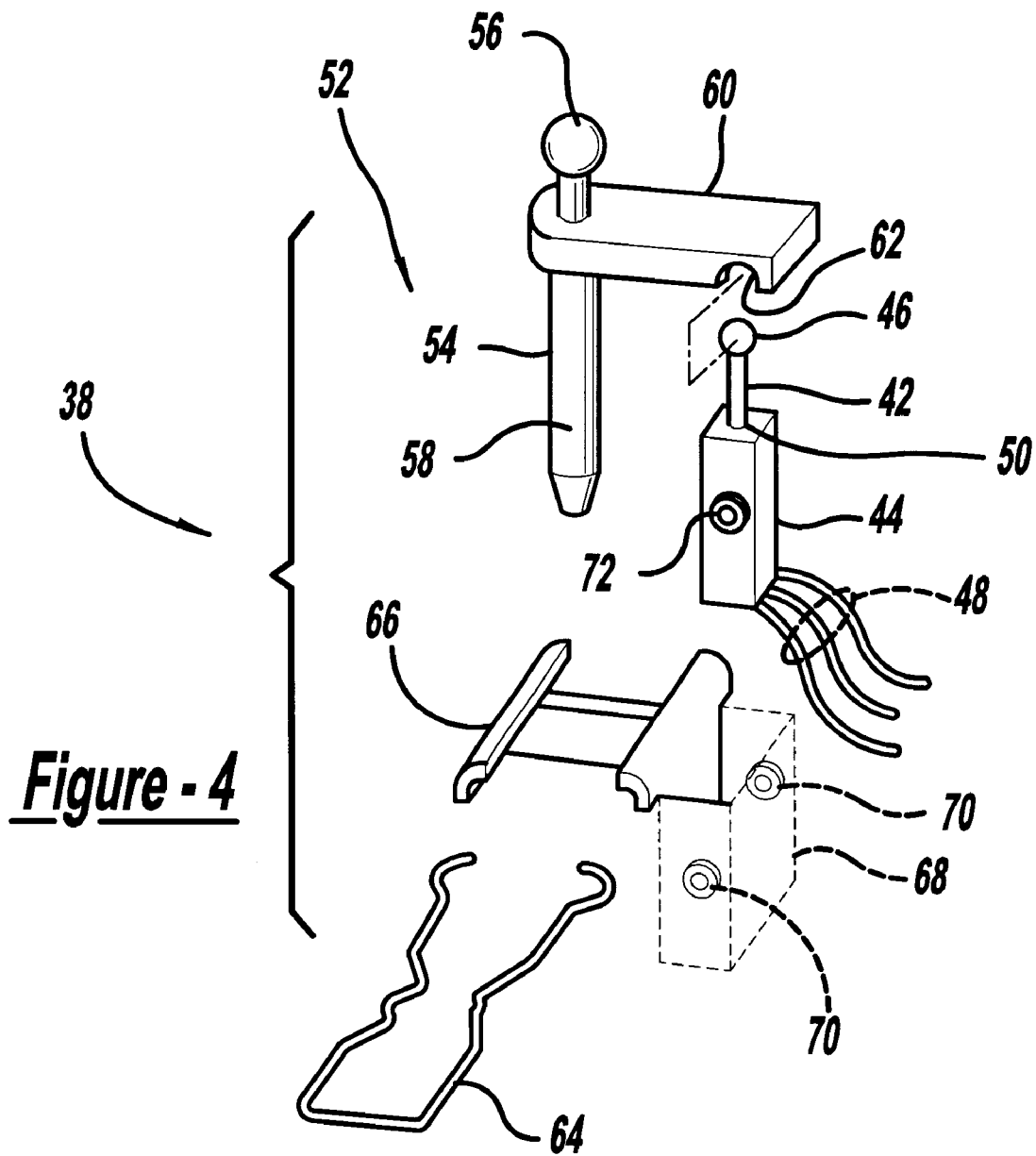
FIG. 4 is an exploded view of the position sensor assembly.

As shown in FIG. 4, one of the retaining lips 66 is formed integral with potentiometer case 68. Potentiometer case 68 may be formed integral with housing reinforcement member 24 or may be mounted independently to housing reinforcement member 24. Potentiometer case 68 receives potentiometer 40 and has a pair of protrusions 70 which engage dimples formed in potentiometer housing 44. Mounting of potentiometer housing 44 within potentiometer case 68 as described herein enables potentiometer 42 to rotate about the interconnection between protrusions 70 and dimples 72. This compensates for slight arcuate movement of friction pin head 56.

In operation, potentiometer case 68, retaining lips 66, and dampening spring 64 are attached to housing reinforcement member 24. Alternatively, retaining lips 66 and potentiometer case 68 may be formed integral with housing reinforcement member 24, and dampening spring 64 may be installed thereafter. Friction pin head 56 attaches to backing plate 28 at a socket 74 and translates with displacement of backing plate 28 and attached mirror glass 22. As backing plate 28 and mirror glass 22 experience vibration transmitted through the vehicle and from wind, the interaction between shank 58 and dampening spring 64 dampens axial movement of friction pin 54, thereby dampening axial movement of wiper or shaft 42 of potentiometer 40. As described above, adjustment of backing plate 28 and mirror glass 22 by motor 32 causes slight arcuate movement of head 56 and shank 58 about dampening spring 64, thereby causing corresponding accurate movement of head 46 and shaft 42 potentiometer 40. This slight arcuate movement of potentiometer 40 is compensated by enabling rotation of potentiometer 30 about the interconnection between protrusions 70 and dimples 72.

In view of the foregoing, one can see that the subject invention provides an improved position sensing assembly for a motorized mirror. In particular, direct attachment between the position sensor assembly and the backing plate provides more accurate positional information, as it eliminates inaccuracies introduced by gear backlash. Further, the position sensor is located opposite the pivot point about which the backing plate pivots when displaced by the electric motor. Further yet, a dampening device may be included integral to the potentiometer or an additional dampening device may provide more stability to the mirror glass and a more stable output signal from the position sensor assembly. Further yet, the position sensor assembly is embodied as a free standing assembly which may be retrofit onto existing systems and may be separated from the motorized unit.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed:

1. A mirror assembly for a vehicle comprising:
   a mirror housing;
   a reflective element;
   a backing assembly supported by the mirror housing, the backing assembly supporting the reflective element, the backing assembly having a pivot point about which the backing assembly and the reflective element pivot;
   an electric motor mounted to the mirror housing, the electric motor being responsive to an electrical input to displace the backing assembly and supported reflective element about the pivot point; and
   a position sensor including a potentiometer and a potentiometer housing receiving the potentiometer, said potentiometer and said potentiometer housing being connected between said backing assembly and said mirror housing for accurately detecting relative displacement between said backing assembly and said mirror housing, wherein the position sensor includes a dampener to dampen movement of the position sensor.

2. The apparatus of claim 1 wherein the dampener further comprises a dampener assembly operatively connected to the position sensor, the dampener assembly dampening movement of the position sensor.

3. The apparatus of claim 1 wherein the pivot point is positioned between the backing assembly and the electric motor.

4. The apparatus of claim 1 wherein the pivot point is located in proximity to a centerline of the reflective element.

5. The apparatus of claim 1 wherein the potentiometer rotates with respect to the potentiometer housing in accordance with displacement of the backing assembly.

6. The apparatus of claim 1 wherein the position sensor further comprises:
- a shaft reciprocating within the potentiometer housing,
- wherein the potentiometer housing contains a fluid, the fluid dampening movement of the shaft within the potentiometer housing.

7. A mirror assembly for a vehicle comprising:
- a mirror housing;
- a reflective element;
- a backing assembly supported by the mirror housing, the backing assembly supporting the reflective element, the backing assembly having a pivot point about which the backing assembly and the reflective element pivot;
- an electric motor mounted to the mirror housing, the electric motor being responsive to an electrical input to displace the backing assembly and supported reflective element about the pivot point; and
- a position sensor including a potentiometer and a potentiometer housing receiving the potentiometer, said potentiometer and said potentiometer housing being connected between said backing assembly and said mirror housing for accurately detecting relative displacement between said backing assembly and said mirror housing.

8. The apparatus of claim 7 further comprising a dampener assembly operatively connected to the position sensor, the dampener assembly dampening movement of the position sensor.

9. The apparatus of claim 7 wherein the pivot point is positioned between the backing assembly and the electric motor.

10. The apparatus of claim 7 wherein the pivot point is located in proximity to a centerline of the reflective element.

11. The apparatus of claim 7 wherein the potentiometer rotates with respect to the potentiometer housing in accordance with displacement of the backing assembly.

12. The apparatus of claim 7 wherein the position sensor further comprises:
- a shaft reciprocating within the potentiometer housing,
- wherein the potentiometer housing contains a fluid, the fluid dampening movement of the shaft within the potentiometer housing.

13. A mirror assembly for a vehicle comprising:
- a mirror housing;
- a reflective element;
- a backing assembly supported by the mirror housing, the backing assembly supporting the reflective element, the backing assembly having a pivot point about which the backing assembly and the reflective element pivot;
- an electric motor mounted to the mirror housing, the electric motor being responsive to an electrical input to displace the backing assembly and supported reflective element about the pivot point;
- a dampener assembly operatively connected to the backing assembly and the mirror housing, the dampener assembly dampening movement of position sensor; and
- the position sensor including a potentiomer and a potentiometer housing receiving the potentiometer, said potentiometer and said potentiometer housing being connected between said backing assembly and said mirror housing detecting displacement of the dampener assembly, the position sensor generating an output signal in accordance with displacement of the backing assembly.

14. The apparatus of claim 13 wherein the dampener assembly further comprises:
- a pin operatively connected to the backing assembly and reciprocating in accordance with movement of the backing assembly;
- a spring engaging the pin and dampening movement of the backing assembly; and
- a flange connected to the position sensor to correspondingly dampen movement of the position sensor.

15. The apparatus of claim 13 wherein the pivot point is positioned between the backing assembly and the electric motor.

16. The apparatus of claim 13 wherein the position sensor further comprises:
- a potentiometer; and
- a potentiometer housing receiving the potentiometer, the potentiometer housing being attached to the mirror housing.

17. The apparatus of claim 13 wherein the potentiometer rotates with respect to the potentiometer housing in accordance with displacement of the backing assembly.

18. The apparatus of claim 13 wherein the position sensor further comprises:
- a shaft reciprocating within the potentiometer housing,
- wherein the potentiometer housing contains a fluid, the fluid dampening movement of the shaft within the potentiometer housing.

* * * * *

UNITED STATES PATENT AND TRADEMARK OFFICE
CERTIFICATE OF CORRECTION

PATENT NO. : 6,254,242 B1  Page 1 of 1
DATED : July 3, 2001
INVENTOR(S) : Paul R. Henion et al.

It is certified that error appears in the above-identified patent and that said Letters Patent is hereby corrected as shown below:

Column 4,
Line 5, "accurate" should be -- arcuate --.
Line 5, after "42" insert -- of --.
Line 7, "30" should be -- 40 --.

Column 6,
Line 11, "potentiomer" should be -- potentiometer --.

Signed and Sealed this

Seventeenth Day of February, 2004

JON W. DUDAS
*Acting Director of the United States Patent and Trademark Office*